US005944923A

United States Patent [19]

Hayashi et al.

[11] Patent Number: 5,944,923

[45] Date of Patent: Aug. 31, 1999

[54] ALUMINUM ALLOY SHEET WITH EXCELLENT FORMABILITY AND METHOD FOR MANUFACTURE THEREOF

[75] Inventors: Noboru Hayashi, Tochigi; Kunihiro Yasunaga, Kanuma; Hideo Yoshida; Hidetoshi Uchida, both of Aichi; Hideo Itoh, Gifu, all of Japan

[73] Assignees: Honda Giken Kogyo Kabushiki Kaisha; Sumitomo Light Metal Industries, Ltd., both of Tokyo, Japan

[21] Appl. No.: 08/781,267

[22] Filed: Jan. 10, 1997

[51] Int. Cl.[6] .................................................... C23C 00/00

[52] U.S. Cl. .......................... 148/537; 148/246; 420/544; 420/543; 420/542; 420/553; 420/535

[58] Field of Search .................................... 420/544, 543, 420/542, 553, 535; 148/246

[56] References Cited

U.S. PATENT DOCUMENTS 5,399,192 3/1995 Yamasoe ................................ 106/186

FOREIGN PATENT DOCUMENTS 2230974 11/1990 United Kingdom ........... C25D 13/20

*Primary Examiner*—Patrick Ryan
*Assistant Examiner*—M. Alexandra Elve
*Attorney, Agent, or Firm*—Flynn, Thiel, Boutell & Tanis, P.C.

[57] ABSTRACT

The invention provides an aluminum alloy sheet that has excellent formability, high coat-baking hardenability, and ensures a proof stress of 200 MPa or more after the coat-baking stage, and that gives favorable product surface quality after the forming stage and excellent corrosion resistance, and that is particularly suitable for external automobile body plates. The aluminum alloy sheet comprises: 0.9 to 1.3 wt. % of Si, 0.4 to 0.6 wt. % of Mg, 0.05 to 0.15 wt. % of Mn, 0.01 to 0.1 wt. % of Ti, with the remainder comprising Al and inevitable impurities, while limiting Fe as an impurity to 0.2 wt. % or less and Cu as an impurity to 0.1 wt. % or less; a coating film of a lubricant composition containing a water-dispersible polyurethane resin and a natural wax on the aluminum alloy sheet.

2 Claims, No Drawings

ALUMINUM ALLOY SHEET WITH EXCELLENT FORMABILITY AND METHOD FOR MANUFACTURE THEREOF

FIELD OF THE INVENTION

The present invention relates to an aluminum alloy sheet with excellent formability, particularly to an aluminum alloy sheet suitable for external automobile body plates, and to a method for the manufacture thereof.

BACKGROUND OF THE INVENTION

Reduction of automobile weight has been aggressively promoted from the viewpoint of protection of the global environment. Current trends involve switching the material used from steel to aluminum to reduce the weight of the automobile. In this respect, various types of aluminum alloys have been developed as external automobile body plates. In Japan, the 5000 Series Al—Mg—Zn—Cu alloys (disclosed in JP-A-103914(1978) and JP-A-171547(1983), (the term "JP-A-" referred herein signifies "unexamined Japanese patent publication") and Al—Mg—Cu alloys (disclosed in JP-A-219139(1989)) have been developed as aluminum alloys for external automobile body plates. Several of these aluminum alloy sheets are already in practical application.

In Western countries, 6000 Series Al—Mg—Si alloys such as 6009 alloy, 6111 alloy, and 6016 alloy have been introduced (disclosed in JP-A-19117(1978)). The 6000 Series aluminum. alloys have sufficient formability to be used as external automobile body plates and provide high strength after heat treatment during the coat-baking stage, though they are somewhat inferior in formability to the 5000 Series aluminum alloys. Accordingly, the 6000 Series aluminum alloys are expected to provide thinner and lighter materials than the 5000 Series aluminum alloys, but the product surface quality after forming is inferior to that of the 5000 Series.

Typical defects appearing during the forming stage include stretch-strain marks (hereinafter referred to simply as "SS marks"), orange peel (hereinafter referred to simply as "rough surface"), and ridging marks. SS marks are most likely to appear on a material showing high yield elongation during plastic working, and often become a problem, particularly in the 5000 Series alloys. Rough surface is most commonly observed on a material with a coarse crystal grain size. Ridging marks are a surface irregularity caused by a significant difference in behavior of crystal grains at the boundary of a group of segregated crystal grains with almost identical crystalline orientation relative to each other, even if the size of these segregated crystal grains is sufficiently fine not to induce a rough surface.

For SS marks and rough surface, countermeasures are applied by adopting leveler correction and minimizing the crystal grain size, respectively. For ridging marks, however, insufficient investigation has been carried out because the defect causes a problem only under conditions where exceptional surface quality is needed after forming, as in external automobile body plates. Even where 6000 Series aluminum alloy sheets are formed for use as external automobile body plates, occurrence of ridging marks is often observed, and becomes a problem. In some cases, the 6000 Series aluminum alloys induce corrosion, particularly filiform corrosion, after coat-baking treatment, so preventive measures are also required.

Generally speaking, aluminum alloys often fail to provide satisfactory formability in press-forming compared with steel plates when a lubricant for press-forming is applied thereto. Therefore, further improvements are necessary before aluminum alloys can match the stringent formability requirements applied to steel plates.

A method is disclosed in JP-A-255587(1993) which enables continuous forming without applying lubricant. According to the disclosure, a composition comprising 100 wt. parts of a water-dispersible polyurethane resin, 5 to 50 wt. parts of silica particles, and 0.5 to 30 wt. parts of a lubricant consisting of a polyolefin wax and a fluororesin powder is applied to the surface of the metallic plate to prepare the lubricant-treated metallic plate. This treatment allows the steel plates to be press-formed at a high speed, and creates a lubricant film which provides excellent corrosion resistance and coating adhesiveness. However, this treatment cannot be satisfactorily applied to aluminum alloy sheets.

SUMMARY OF THE INVENTION

The present invention was completed based on a lubricant-treated film that enables forming work without applying the above-described lubricant for further improving the forming characteristics of an aluminum alloy sheet for automobile body external panels. Experiments and investigations were carried out on the forming characteristics of the 6000 Series aluminum alloy sheets which were processed using lubricants of various compositions, and through a study on the method for manufacturing the 6000 Series aluminum alloy sheets for automobiles. This new method comprises ingot homogenization, hot-rolling, cold-rolling, solid solution treatment, and final heat treatment, and combines the manufacturing method with lubricant treatment. The object of the present invention is to provide a surface-treated aluminum alloy sheet with further improved forming characteristics, providing strong hardenability during the coat-baking treatment, resulting in excellent formed-product surface quality and coat-baking hardenability.

The aluminum alloy sheet according to the present invention with excellent formability and which achieves the above-described objectives comprises: 0.9 to 1.3 wt. % of Si, 0.4 to 0.6 wt. % of Mg, 0.05 to 0.15 wt. % of Mn, 0.01 to 0.1 wt. % of Ti, with the remainder comprising Al and inevitable impurities, while limiting Fe as an impurity to 0.2 wt. % or less and Cu as an impurity to 0.1 wt. % or less; a coating film of lubricant composition containing water-dispersible polyurethane resin and a natural wax on the aluminum alloy sheet, wherein the aluminum alloy sheet has a proof stress of 200 MPa or more after press-forming and after subsequent coat-baking treatment takes place at 180° C. for 1 hr.

The first aspect of the method for manufacturing an aluminum alloy sheet with excellent formability according to the present invention comprises the steps of: applying solid solution treatment to an aluminum ingot comprising 0.9 to 1.3 wt. % of Si, 0.4 to 0.6 wt. % of Mg, 0.05 to 0.15 wt. % of Mn, 0.01 to 0.1 wt. % of Ti, with the remainder comprising Al and inevitable impurities, while limiting Fe as an impurity to 0.2 wt. % or less and Cu as an impurity to 0.1 wt. % or less, at a temperature of 500° C. or above for 6 hrs. or more; cooling the plate to a temperature of 450° C. or below to begin hot-rolling; finishing hot-rolling in a temperature range from 200 to 350° C.; conducting cold-rolling at a draft of 70% or more; then applying solid solution treatment to the alloy sheet and holding it at 530° C. or above for 60 sec. or less followed by quenching; forming a chromate film onto the quenched alloy sheet; forming a film of lubricant composition containing a water-dispersible polyurethane resin and a natural wax onto the chromate film; then applying heat treatment to the coated alloy sheet in a temperature range from 200 to 240° C. for 60 sec. or less.

The second aspect of the method for manufacturing an aluminum alloy sheet according to the present invention further comprises the step of treating the alloy sheet by intermediate annealing at a temperature range from 350 to 420° C. after hot-rolling and before cold-rolling.

The third aspect of the present invention is to form a lubricant film on the chromate film by applying a luburicant composition thereon, which lubricant composition contains 60 to 90 wt. % of a water-dispersible polyurethane resin and 5 to 20 wt. % of particles of a silicon compound, and further contains 5 to 30 wt. % of lubricant as the solid ingredient consisting of natural wax, a polyolefin wax, and a fluororesin powder.

The fourth aspect of the present invention is that the size of the silicon compound particles contained in the lubricant composition ranges from 0.05 to 4.0 $\mu$m.

Furthermore, the method for manufacturing aluminum alloy sheet with excellent formability according to the present invention to attain the above-described object is characterized by the steps of: applying solid solution treatment to an aluminum ingot comprising 0.9 to 1.3 wt. % of Si, 0.4 to 0.6 wt. % of Mg, 0.05 to 0.15 wt. % of Mn, 0.01 to 0.1 wt. % of Ti, with the remainder comprising Al and inevitable impurities, while limiting Fe as an impurity to 0.2 wt. % or less and Cu as an impurity to 0.1 wt. % or less at a temperature of 500° C. or above for 6 hrs. or more; cooling the plate to a temperature of 450° C. or below to begin hot-rolling; finishing hot-rolling in a temperature range of from 200 to 350° C.; conducting cold-rolling at a draft of 70% or more; after cold-rolling, applying solid solution treatment to the alloy sheet and holding it at at 530° C. or above for 60 sec. or less followed by quenching; holding the quenched alloy sheet at room temperature for 24 hrs. or more; then applying heat treatment to the alloy sheet in a temperature range of from 200 to 250° C. for 60 sec. or less; and further, the step of treating the aluminum alloy sheet by intermediate annealing in a temperature range of from 350 to 420° C. after hot-rolling, then applying cold-rolling to the aluminum alloy sheet.

DETAILED DESCRIPTION OF THE PREFERRED EMBODIMENTS

The significance of the existence of and reasons for limiting the content of alloying components in the aluminum alloy according to the present invention are described below. Silicon as an essential component enhances the strength of the alloy by forming $Mg_2Si$ with coexisting Mg. A preferable range of Si content is from 0.9 to 1.3 wt. %. Less than 0.9 wt. % of Si content may fail to attain sufficient formability. More than 1.3 wt. % of Si content increases the proof stress of the alloy during press-forming work, and degrades the formability and the shape-freezing properties. A preferable range of Mg content is from 0.4 to 0.6 wt. %. Less than 0.4 wt. % of Mg content fails to provide sufficient strength through the heating in the coat-baking step. More than 0.6 wt. % of Mg content results in high proof stress after the solid solution treatment or final heat treatment, which is likely to cause degradation of formability and shape-freezing properties.

Manganese is effective in reducing the crystal grain size of the alloy and in preventing the occurrence of a rough surface during forming work. The preferred range of Mn content is from 0.05 to 0.15 wt. %. Less than 0.05 wt. % of Mn content cannot give sufficient effect, and more than 0.15 wt. % of Mn content increases the quantity of coarse intermetallic compounds, degrading formability. Titanium is also effective in producing a fine alloy structure, and a preferable range of Ti addition is from 0.01 to 0.1 wt. %. Less than 0.01 wt. % of Ti content gives a less effect, and more than 0.1 wt. % of Ti content increases the quantity of coarse intermetallic compounds which degrade formability.

For an aluminum alloy according to the present invention, it is important to limit the Cu content to 0.1 wt. % or less and the Fe content to 0.2 wt. % or less. When the Cu content exceeds 0.1 wt. %, the corrosion resistance degrades, and filiform corrosion is especially likely to occur. If the Fe content exceeds 0.2 wt. %, the formability degrades. Other than the elements described above, B may be added in an amount of 0.01 wt. % or less for ensuring fine crystal grains in the ingot.

The conditions for manufacturing an aluminum alloy sheet according to the present invention are described below. An aluminum alloy ingot with the above-described composition is prepared using a semi-continuous casting process. The ingot is treated by homogenization at a temperature range of from 500° C. to a point below the melting point of the alloy for 6 hrs. or more. If the homogenization temperature is less than 500° C., the removal of ingot segregation and the homogenization of the alloy structure are not sufficient, and the formation of a solid solution of $Mg_2Si$ component contributing to the strength becomes insufficient, thus degrading the formability in some cases. After completing harmonization, the ingot is cooled from the homogenization temperature to 450° C. or below, following which hot-rolling of the ingot begins. If the ingot is cooled to room temperature after completing the homogenization and is then heated to a hot-rolling temperature, a coarse deposit of $Mg_2Si$ is formed during the heating stage, and the formation of a solid solution during the solid solution treatment is impeded, resulting in a degradation of in formability.

A preferable starting point for hot-rolling ranges from 350 to 450° C., and the preferable end point ranges from 200 to 350° C. When the starting point of hot-rolling exceeds 450° C., the probability rises that the structure of the alloy during hot-rolling will trigger the formation of groups of crystal grains with nearly-matching grain orientation in the alloy sheet after cold-rolling and after the solid solution treatment. Accordingly, ridging marks are likely to appear on the surface of the plate after press-forming. If the starting temperature is lower than 350° C., the deformation resistance of the material increases. If hot-rolling ends at a temperature exceeding 350° C., secondary recrystallization is likely to occur after the rolling, which causes the generation of ridging marks owing to the generation of a coarse structure. When hot-rolling ends at below 200° C., water-soluble rolling oil stains are likely to remain on the surface of the alloy sheet as a contaminant, degrading the surface quality of the alloy sheet.

After completing hot-rolling, cold-rolling is applied to the alloy sheet. Alternatively, an intermediate annealing in a temperature range from 350 to 420° C. may be applied after hot-rolling and before cold-rolling. The intermediate annealing decomposes the hot-rolled structure to provide more favorable formability. Even when the intermediate annealing is eliminated, it is possible to attain characteristics which do not raise practical problems. Therefore, whether the intermediate annealing is applied or not depends on the use and required characteristics of the plate produced.

The alloy sheet is then subjected to cold-rolling giving 70% or more of draft to obtain a special thickness, and the alloy sheet undergoes the solid solution treatment and the quenching treatment. When the draft of the cold-rolling immediately before the solid solution treatment is less than 70%, the crystal grains after the solid solution treatment tend to become coarse, and a rough surface may occur. In addition, the decomposition of the hot-rolled structure is not sufficiently conducted, thus ridging marks is likely to occur, degrading the formability.

The solid solution treatment is conducted at a temperature of 530° C. or above, more preferably ranging from 530 to 580° C., for 60 sec. or less. When the heating temperature is less than 530° C., the formation of a solid solution in the deposit becomes insufficient, and fails to create the specified strength and formability. Even if the specified strength and formability can possibly be acquired, a very long period of heat treatment is required, which is unfavorable from the industrial viewpoint. A preferable holding time is 60 sec. or less. When the holding time exceeds 60 sec., the productivity decreases and becomes unfavorable from the industrial point of view. A preferable temperature rise speed is 2° C./sec. or more, though it is not specifically defined. A preferable cooling speed during the quenching stage is 5° C./sec. or more to cool to a temperature of 100° C. or below to conduct quenching, though it is also not specifically defined. When the cooling speed is less than 5° C./sec., coarse compounds are likely to be deposited at the grain boundaries, degrading the ductility.

The first mode according to the present invention is shown below.

After conducting the quenching treatment, chromate treatment is applied to the surface of the alloy sheet to form a chromate film preferably with a coating weight of 5 to 50 mg Cr/m$^2$. The chromate film increases the adhesiveness of the aluminum alloy sheet and the lubricant film formed thereon, and confers press-formability and corrosion resistance on the aluminum alloy sheet along with the performance of the lubricant film. An insufficient amount of chromium results in insufficient corrosion resistance, whereas an excessive amount is likely to degrade the adhesiveness.

A lubricant composition containing a water-dispersible polyurethane resin is applied to the chromate film to form a lubricant film. The preferred lubricant composition contains 60 to 90 wt. % of a water-dispersible polyurethane resin and 5 to 20 wt. % of particles of silicon compound, and further contains 5 to 30 wt. % of a lubricant as the solid ingredient consisting of a natural wax, a polyolefin wax, and a fluororesin powder. The preferred coating dry weight of the lubricant composition ranges from 0.5 to 4.0 g/m$^2$. Less than 0.5 g/m$^2$ of coating weight results in insufficient lubrication, and more than 4.0 g/m$^2$ of coating weight induces poor followability of the film during the press-forming stage. More preferably, the film coating weight ranges from 1.0 to 3.0 g/m$^2$.

Applicable water-dispersible polyurethane resins include: an aqueous dispersion or suspension of a polyurethane resin prepared by extending the chains of polyols such as polyester polyol and polyether polyol and of aromatic, aliphatic, or alicyclic diisocyanates using low molecular weight compounds such as diols and diamines with two or more active hydrogen atoms. Examples of water-dispersible polyurethanes are disclosed in JP-A-255578(1993).

Silicon compound particles are effective in improving the corrosion resistance of the surface-treated aluminum alloy sheet according to the present invention, and a preferable average particle size ranges from 0.05 to 4.0 $\mu$m. Colloidal silica and silica powder are applicable. The lubricant is used to improve the lubrication, and a preferable type is a mixture of a natural wax with a melting point ranging from 50 to 90° C., a polyolefin wax with a melting point of 90° C. or above, and a fluororesin powder. The blending ratio of natural wax, polyolefin wax, and fluororesin in the lubricant is 0.3 to 0.7 wt. parts of sum of the polyolefin wax and fluororesin powder to 1 wt. part of the lubricant, and more preferably 0.4 to 0.6 wt. parts of the sum thereof. The preferred average particle size of the polyolefin wax and the fluororesin ranges from 0.1 to 4.0 $\mu$m.

Following the lubricant film formation, final heat treatment is applied. The final heat treatment is applied to improve the coat-baking hardenability during the coating stage after the forming stage. The material after forming the lubricant film is held at a temperature range of from 200 to 240° C. for 60 sec. or less. A temperature of less than 200° C. results in insufficient improvement of the coat-baking hardenability. Heating more than 240° C. or more than 60 sec. tends to induce separation of the film during the forming stage, and the proof stress of the alloy increases, hindering its formability.

According to the present invention, the material composition is selected to satisfy the total characteristics including strength, formability, and corrosion resistance, and the combination of the specified conditions of ingot homogenization, hot-rolling, cold-rolling, solid solution treatment, lubricant treatment, and final heat treatment improves the formability, the shape freezing properties, the coat-baking hardenability after the forming stage, and the proof stress required to provide anti-denting properties, thus forming fine crystal grains without inducing a rough surface, ensuring random crystal orientation to prevent surface defects such as ridging marks, and providing superior product surface quality after forming, to provide an Al—Si—Mg system aluminum alloy sheet particularly suitable for automobile body external panels.

Also, according to the present invention, the lubrication properties of the aluminum alloy sheet during the press-forming stage are improved over the entire temperature range from the low temperature range, to the high temperature range even when the temperature of the aluminum alloy sheet increases during high speed press-forming, by providing a chromate film on the surface of the aluminum alloy sheet, forming a lubricant film consisting of a water-dispersible polyurethane resin, a silicon compound particles, and a lubricant onto the chromate film, and particularly by adding a natural wax to the lubricant, thus improving the corrosion resistance of the lubricant-treated aluminum alloy sheet.

The second mode according to the present invention is explained below.

Following the above-described solid solution treatment and quenching treatment, final heat treatment is applied. The final heat treatment is applied to improve the coat-baking hardenability. That is, the quenched material is allowed to stand at room temperature for 24 hrs. or more, following which it is held at a temperature ranging from 200 to 250° C. for 60 sec. or less. If the heating temperature is below 200° C., the improvement of the coat-baking hardenability is insufficient. If the heating temperature exceeds 250° C. or the heating period exceeds 60 sec., the formability and the coat-baking hardenability may degrade.

According to the present invention, the material composition is selected to give strength, formability, and corrosion resistance, and the combination of the specified conditions of ingot homogenization, hot-rolling, cold-rolling, solid solution treatment, lubricant treatment, and final heat treatment improves the formability, the shape freezing properties, the coat-baking hardenability after the forming stage, the proof stress to provide anti-denting properties, thus forming fine crystal grains without inducing rough surface and ensuring random crystal orientation to prevent surface defects such as ridging marks, and providing superior product surface quality after forming, to provide an Al—Si—Mg system aluminum alloy sheet suitable particularly for automobile body external panels.

EXAMPLES

The present invention is described in more detail below referring to the examples according to the invention compared against comparative examples.

Example 1

Ingots of aluminum alloys with the compositions shown in Table 1 were separately prepared by a semi-continuous casting process. Each of the prepared ingots was surface-ground and then subjected to homogenization at 545° C. for 14 hrs., followed by cooling to 400° C. to begin hot-rolling to make a plate with a thickness of 4.8 mm at a final temperature of 240° C. The rolled plate was charged to a batch-furnace to undergo intermediate annealing at 380° C. for 1 hr., and was cold-rolled to a thickness of 1 mm. The plate then underwent the solid solution treatment at 555° C., and was held at that temperature for 30 sec. The treated plate was subjected to quenching, degreasing, and washing, and treated in a commercially available reaction type chromate solution to form a phosphoric chromate film at a coating weight of 20 mg $Cr/m^2$. The chromate film was coated with a lubricant composition which contained 70 wt. % of a water-dispersible polyurethane resin and 10 wt. % of a particles of silicon compound, and further contained 20 wt. % of a lubricant as the solid ingredient consisting of a mixture of lanolin wax, polyethylene powder, and tetrafluoroethylene resin powder at a weight ratio of 4:3:3, to a coating weight of 2.0 $g/m^2$. The baking treatment of the lubricant film was applied at 220° C. for 20 sec.

The obtained aluminum alloy sheets were used as the specimens for tensile tests and Erichsen tests. In addition, to simulate press-working, the specimens underwent a 2% tensile deformation to observe the surface condition (product surface quality). For the plates which were subjected to tensile deformation treatment, a heat treatment equivalent to a coat-baking at 180° C. for 1 hr. was applied to determine the tensile characteristics. Also, for the plates which were subjected to tensile deformation treatment, a surface preparation for coating was applied using a commercially available zinc phosphate solution. They were then coated with a commercial automobile coating material and underwent coat-baking at 180° C. for 1 hr. The coated specimens were subjected to cross-cutting deep into the surface of the aluminum plate using a sharp paper knife, and were then immersed in a 5% NaCl solution at 35° C. for 24 hrs., and allowed to stand in a cabinet maintained at 50° C. and 80% RH for 1000 hrs. to observe the occurrence of filiform corrosion in the cross-cut area.

The test results are summarized in Table 2. As seen in Table 2, Specimen Nos. 1 and No. 2 according to the present invention provide high Erichsen value and excellent formability, have excellent forming-work properties and coat-baking hardenability, and show a strong proof stress of 200 MPa or more. Also, the product surface quality after forming is favorable for these specimens, giving no rough surface or ridging marks, and generating no filiform corrosion.

TABLE 1

| Specimen No. | Composition (wt. %) Si | Fe | Cu | Mn | Mg | Ti |
|---|---|---|---|---|---|---|
| 1 | 1.2 | 0.1 | 0.02 | 0.05 | 0.4 | 002 |
| 2 | 1.0 | 0.2 | 0.08 | 0.14 | 0.5 | 0.02 |

TABLE 2

| Specimen No. | Base material: Tensile characteristics σB MPa | σ 0.2 MPa | δ % | Er value mm | Product surface quality after tensile deformation | Tensile characteristics after tensile deformation followed by heat treatment at 180° C. for 1 hr. σB MPa | σ 0.2 MPa | δ % | Increase in proof stress MPa | Occurrence of filiform corrosion |
|---|---|---|---|---|---|---|---|---|---|---|
| 1 | 218 | 121 | 32 | 11.3 | Good | 308 | 245 | 17 | 124 | None |
| 2 | 208 | 109 | 32 | 11.2 | Good | 304 | 240 | 17 | 131 | None |

Comparative Example 1

Ingots of aluminum alloys with the compositions shown in Table 3 were separately prepared using a semi-continuous casting process. Each of the prepared ingots was surface-ground and then subjected to the same treatment as applied in Example 1 to prepare them for use as specimens. Under the same conditions as in Example 1, the prepared specimens were subjected to tensile testing, Erichsen testing, observation of surface condition after 2% tensile deformation, determination of tensile characteristics after heat treatment at 180° C. for 1 hr., and evaluation of corrosion resistance after coating. The results are summarized in Table 4. Underlined figures in Table 3 are those which fail to achieve the requirements of the present invention.

TABLE 3

| Specimen No. | Composition (wt. %) Si | Fe | Cu | Mn | Mg | Ti |
|---|---|---|---|---|---|---|
| 3 | 1.6 | 0.1 | 0.02 | 0.12 | 0.5 | 0.03 |
| 4 | 1.2 | 0.1 | 0.02 | 0.12 | 0.9 | 0.03 |
| 5 | 1.2 | 0.1 | 0.02 | 0.30 | 0.5 | 0.03 |
| 6 | 1.1 | 0.1 | 0.02 | 0.12 | 0.5 | 0.30 |
| 7 | 0.6 | 0.1 | 0.02 | 0.12 | 0.5 | 0.03 |
| 8 | 1.1 | 0.1 | 0.02 | 0.12 | 0.2 | 0.03 |
| 9 | 1.1 | 0.1 | 0.02 | 0.01 | 0.5 | 0.03 |
| 10 | 1.1 | 0.1 | 0.02 | 0.12 | 0.5 | <0.01 |
| 11 | 1.1 | 0.4 | 0.02 | 0.12 | 0.5 | 0.03 |
| 12 | 1.1 | 0.1 | 0.28 | 0.12 | 0.5 | 0.03 |

TABLE 4

| Specimen No. | Base material: Tensile characteristics σB MPa | σ 0.2 MPa | δ % | Er value mm | Product surface quality after tensile deformation | Tensile characteristics after tensile deformation followed by heat treatment at 180° C. for 1 hr. σB MPa | σ 0.2 MPa | δ % | Increase in proof stress MPa | Occurrence of filiform corrosion |
|---|---|---|---|---|---|---|---|---|---|---|
| 3 | 237 | 149 | 31 | 10.6 | Good | 312 | 258 | 16 | 109 | None |
| 4 | 238 | 156 | 31 | 10.4 | Good | 316 | 259 | 17 | 103 | None |
| 5 | 221 | 121 | 29 | 10.8 | Good | 310 | 249 | 16 | 128 | None |
| 6 | 220 | 123 | 29 | 10.5 | Good | 313 | 246 | 17 | 123 | None |
| 7 | 181 | 84 | 31 | 11.1 | Good | 271 | 138 | 17 | 54 | None |
| 8 | 170 | 78 | 30 | 11.1 | Good | 257 | 121 | 18 | 43 | None |
| 9 | 227 | 119 | 30 | 10.5 | Rough surface | 307 | 241 | 18 | 122 | None |
| 10 | 224 | 125 | 29 | 10.4 | Good | 307 | 225 | 17 | 100 | None |
| 11 | 224 | 127 | 28 | 10.4 | Good | 312 | 234 | 17 | 107 | None |
| 12 | 242 | 128 | 31 | 11.2 | Good | 332 | 245 | 14 | 117 | Present |

As shown in Table 4, Specimen No. 3 contains a large amount of Si so that the proof stress in the forming stage is high and the formability is poor. Since Specimen No. 4 contains a large amount of Mg, the formability is poor. Specimen Nos. 5 and No. 6 contain large amounts of Mn and Ti, respectively, so they are inferior in formability. Specimen Nos. 7 and No. 8 contain less Si and Mg, respectively. They show low proof stress after coat-baking and are inferior in anti-denting properties. Specimen No. 9 contains less Mn and sufficient reduction in crystal grain size does therefore not occur, so a rough surface is generated during the forming stage. Specimen No. 10 contains less Ti, and Specimen No. 11 contains an excess of Fe, so they are inferior in formability. Specimen No. 12 exceeds the specified Cu limit so that it has poor filiform corrosion resistance.

Example 2

An aluminum alloy ingot comprising 1.2 wt. % of Si, 0.4 wt. % of Mg, 0.05 wt. % of Mn, 0.02 wt. % of Ti, 0.1 wt. % of Fe, 0.02 wt. % of Cu, with the remainder comprising Al and inevitable impurities, (Alloy No. 1 in Table 1) was prepared using a semi-continuous casting process. The prepared ingot was surface-ground and then subjected to homogenization treatment at 550° C. for 10 hrs., and cooled to 410° C. The hot-rolling of the ingot was begun at 410° C. and ended at 235° C. The rolled plate was then subjected to an intermediate annealing at 360° C. for 1 hr. or this step was omitted, followed by cold-rolling to 80% of draft to obtain plates with a thickness of 1 mm. The plate given intermediate annealing underwent solid solution treatment by holding the plate at 540° C. for 20 sec. The plate which was not treated by intermediate annealing underwent the solid solution treatment at 560° C. for 20 sec. After quenching these plates, the same chromate treatment as applied in Example 1 was given (to a coating weight of 20 mg $Cr/m^2$). The chromate film was coated with a lubricant which consisted of 80 wt. % of water-dispersible polyurethane resin and 10 wt. % of a particles of a silicon compound, and further contained 10 wt. % of a lubricant as the solid ingredient with the same composition as in Example 1 to a coating weight of 2.5 $mg/m^2$. The baking treatment of the lubricant film was applied at 230° C. for 10 sec. as the final heat treatment.

The obtained plates were used as the specimens. As in Example 1, tensile tests and Erichsen tests were applied to these specimens, and the product surface quality was observed by giving 2% tensile deformation to simulate press-forming work. In addition, the specimens were subjected to a heat treatment at 180° C. for 1 hr., equivalent to coat-baking treatment, after the tensile deformation to determine the tensile characteristics. After the tensile deformation, the coating treatment was given as in Example 1 to evaluate the corrosion resistance under the same conditions as in Example 1. The results are summarized in Table 5. As seen in Table 5, Specimen No. 13 (with intermediate annealing) and Specimen No. 14 (without intermediate annealing), both of which are according to the present invention, show high hardenability and have excellent proof stress exceeding 200 MPa, while generating no filiform corrosion in the post-coating corrosion test and demonstrate excellent corrosion resistance.

TABLE 5

| Specimen No. | Base material: Tensile characteristics σB MPa | σ 0.2 MPa | δ % | Er value mm | Product surface quality after tensile deformation | Tensile characteristics after tensile deformation followed by heat treatment at 180° C. for 1 hr. σB MPa | σ 0.2 MPa | δ % | Increase in proof stress MPa | Occurrence of filiform corrosion |
|---|---|---|---|---|---|---|---|---|---|---|
| 13 | 220 | 123 | 32 | 11.4 | Good | 311 | 246 | 18 | 123 | None |
| 14 | 217 | 126 | 30 | 11.1 | Good | 309 | 241 | 16 | 115 | None |

Comparative Example 2

An aluminum alloy ingot with the same composition as that in Example 2 was prepared using a semi-continuous casting process. The prepared ingot was surface-ground and treated using the process given in Table 5 to obtain plates with a thickness of 1 mm. These plates were subjected to a chromate treatment similar to that in Example 2 to form a chromate film. The chromate film was coated with a lubricant composition with the composition given in Table 7, the same as in Example 2. Final heat treatment was applied under the conditions shown in Table 6 as the baking treatment of the film. The obtained plates underwent tests similar to those in Example 2. The test results are listed in Table 8. Underlined figures in Tables 5 and 6 are those which fail to achieve the requirements of the present invention.

TABLE 6

| Specimen | Homogenization | Temperature at beginning and end of the heat treatment °C. | Intermediate annealing | Cold-rolling % | Solid solution treatment |
|---|---|---|---|---|---|
| A | 450°C.-10 h | 410/235 | 360° C.-1 h | 80 | 560° C.-20 s |
| B | 550° C.-10 h | 530/360 | 360° C.-1 h | 80 | 560° C.-20 s |
| C | 550° C.-10 h | 410/235 | 360° C.-1 h | 40 | 560° C.-20 s |
| D | 550° C.-10 h | 410/235 | 360° C.-1 h | 80 | 490°C.-20 s |
| E | 550° C.-10 h | 410/235 | 360° C.-1 h | 80 | 560° C.-20 s |
| F | 550° C.-10 h | 410/235 | 360° C.-1 h | 80 | 560° C.-20 s |
| G | 550° C.-10 h | 410/235 | 360° C.-1 h | 80 | 560° C.-20 s |
| H | 550° C.-10 h | 410/235 | 360° C.-1 h | 80 | 560° C.-20 s |
| I | 550° C.-10 h | 410/235 | 360° C.-1 h | 80 | 560° C.-20 s |

TABLE 7

| | Contents of lubricant composition (wt. %) | | | Final heat |
|---|---|---|---|---|
| Specimen | A | B | C | treatment |
| A | 80 | 10 | 10 | 230° C.-10 s |
| B | 80 | 10 | 10 | 230° C.-10 s |
| C | 80 | 10 | 10 | 230° C.-10 s |
| D | 80 | 10 | 10 | 230° C.-10 s |
| E | — | — | — | 230° C.-10 s |
| F | 50 | 30 | 20 | 230° C.-10 s |
| G | 80 | 10 | 10 | 150°C.-60 s |
| H | 80 | 10 | 10 | 250°C.-5 s |
| I | 80 | 10 | 10 | 200° C.-180s |

<<Note>> Lubricant composition
Water-dispersible polyurethane: A
Silicon compound particles: B
Lubricant: C

TABLE 8

| | Base material | | | | Product | Tensile characteristics after tensile deformation followed by heat treatment at 180° C. for 1 hr. | | | | |
|---|---|---|---|---|---|---|---|---|---|---|
| | Tensile characteristics | | | Er | surface quality after | | | | Increase in proof | Occurrence of |
| Specimen No. | σB MPa | σ 0.2 MPa | δ % | value mm | tensile deformation | σB MPa | σ 0.2 MPa | δ % | stress MPa | filiform corrosion |
| A | 198 | 86 | 29 | 10.7 | Good | 234 | 168 | 16 | 82 | None |
| B | 232 | 132 | 32 | 11.3 | Poor | 321 | 262 | 15 | 130 | None |
| C | 222 | 123 | 31 | 11.2 | Rough surface | 308 | 243 | 17 | 120 | None |
| D | 153 | 72 | 25 | 9.8 | Good | 212 | 115 | 19 | 43 | None |
| E | 215 | 120 | 32 | 9.3 | Good | 298 | 239 | 17 | 119 | None |
| F | 221 | 119 | 32 | 10.6 | Good | 307 | 241 | 16 | 123 | None |
| G | 224 | 120 | 31 | 10.7 | Good | 264 | 172 | 22 | 52 | None |
| H | 231 | 147 | 25 | 9.5 | Good | 321 | 255 | 15 | 108 | None |
| I | 240 | 165 | 26 | 9.4 | Good | 317 | 257 | 15 | 95 | None |

As shown in Table 8, Specimen A was subjected to homogenization at an excessively low temperature level, with insufficient $Mg_2Si$ solid solution forming, thus resulting in weak coat-baking hardenability. It failed to obtain a proof stress at or above 200 MPa. Specimen B was treated with an excessively high hot-rolling starting temperature, and the growth of the structure became excessive during the hot-rolling stage, which resulted in the generation of ridging marks after the forming work. Specimen C was treated by small draft cold-rolling before the solid solution treatment, so the decomposition of the hot-rolled structure was not satisfactorily performed, and the resultant formability was poor. Since Specimen D was subjected to low temperatures during the solid solution treatment, the formability became poor, and the formation of the solid solution of the deposit was insufficient, resulting in a failure to obtain satisfactory strength after coat-baking. Specimen E was not applied with a lubricant composition, and its formability was poor. Since Specimen F used an inadequate lubricant blending ratio, its formability was poor. Specimen G underwent an excessively low final heat treatment temperature. The obtained coat-baking hardenability was insufficient and failed to achieve a proof stress at or above 200 MPa. Specimen H was subjected to an excessively high final heat treatment temperature, and Specimen I was subjected to an excessively long period of final heat treatment. Their formability was poor.

Comparative Example 3

An aluminum alloy ingot with the same composition as that in Example 2 was prepared using a semi-continuous casting process. The prepared ingot was surface-ground and treated by homogenization at 545° C. for 14 hrs., cooled to 400° C., starting hot-rolling at 400° C. and ending at 240° C. to obtain plates with a thickness of 4.8 mm. These plates were subjected to intermediate annealing in a batch-furnace at 380° C. for 1 hr. The annealed plates underwent cold-rolling to form plates with a thickness of 1 mm. The obtained plates were subjected to solid solution treatment at 555° C. for 30 sec. followed by quenching, degreasing, and washing. The plates were coated with a phosphoric chromate film at a coating weight of 20 mg $Cr/m^2$ using a commercially available chromate solution. The chromate film was further coated with a lubricant comprising 70 wt. % of a water-dispersible polyurethane resin and 10 wt. % of particles of a silicon compound, and further containing 20 wt. % of a lubricant as the solid ingredient consisting of a mixture of polyethylene powder and tetrafluoroethylene resin powder at a weight ratio of 5:5, to a dry coating weight of 2.0 $mg/m^2$. The baking treatment of the lubricant film was applied at 220° C. for 20 sec.

The obtained aluminum alloy sheets were used as the specimens. These specimens were tested following the procedure described in Example 2. The obtained tensile characteristics of the base material were 219 MPa of σB, 120 MPa of $\sigma_{0.2}$, 32% of δ, 10.2 mm of Er, and the characteristics of the plates after the heat treatment at 180° C. for 1 hr. were 308 MPa of σB, 244 MPa of $\sigma_{0.2}$, 17% of δ. These characteristics suggest that the formability is poor.

Example 3

Aluminum alloy ingots with the composition shown in Table 9 were separately prepared using a semi-continuous casting process. Each of the prepared ingots was surface-ground and treated by homogenization at 530° C. for 12 hrs., cooling the ingot to 420° C., starting hot-rolling at 420° C. and ending at 280° C. to obtain plates with a thickness of 4 mm. These plates were subjected to intermediate annealing in a batch-furnace at 380° C. for 4 hrs. The annealed plates underwent cold-rolling to form plates with a thickness of 1 mm. They were subjected to solid solution treatment at 540° C. for 30 sec. After quenching, they were allowed to stand at room temperature for 1 week, followed by heat treatment at 220° C. for 15 sec.

These obtained aluminum alloy sheets were used as the specimens for tensile tests and Erichsen tests. In addition, to simulate press-working, the specimens underwent a 2% tensile deformation to observe the surface condition (product surface quality). Also, for the plates which were subjected to tensile deformation treatment, a surface preparation for coating was applied using a commercially available zinc phosphate solution. They were then coated with a commercial automobile coating material and coat-baked at 180° C. for 1 hr. The coated specimens were subjected to cross-cutting deep into the surface of the aluminum plates using a sharp paper knife. They were then immersed in a 5% NaCl solution at 35° C. for 24 hrs., and allowed to stand in a cabinet maintained at 50° C. and 80% RH for 1000 hrs. to observe the occurrence of filiform corrosion in the cross-cut area.

The test results are summarized in Table 10. As seen in Table 10, Specimen Nos. 1 and 2 according to the present invention provide high Erichsen value and excellent formability, have excellent forming-working and coat-baking hardenability, and show a strong proof stress exceeding 200 MPa. Also, the product surface quality after forming is favorable for these specimens, giving no rough surface or ridging marks, and generating no filiform corrosion.

TABLE 9

| Specimen No. | Si | Fe | Cu | Mn | Mg | Ti |
|---|---|---|---|---|---|---|
| | Composition (wt. %) | | | | | |
| 1 | 1.2 | 0.1 | 0.02 | 0.05 | 0.4 | 0.02 |
| 2 | 1.0 | 0.2 | 0.08 | 0.14 | 0.5 | 0.02 |

TABLE 10

| Specimen No. | Base material: Tensile characteristics σB MPa | σ 0.2 MPa | δ % | Er value mm | Product surface quality after tensile deformation | Tensile characteristics after tensile deformation followed by heat treatment at 180° C. for 1 hr. σB MPa | σ 0.2 MPa | δ % | Increase in proof stress mm |
|---|---|---|---|---|---|---|---|---|---|
| 1 | 215 | 118 | 32 | 10.0 | Good | 305 | 242 | 19 | 0 |
| 2 | 210 | 112 | 33 | 10.1 | Good | 302 | 238 | 20 | 0 |

Comparative Example 4

Ingots of aluminum alloys with the compositions shown in Table 11 were separately prepared using a semi-continuous casting process. Each of the prepared ingots was surface-ground and then subjected to the same treatment as those applied in Example 1. Under the same conditions as in Example 1, the prepared specimens were subjected to tensile testing, Erichsen testing, observation of surface condition after 2% tensile deformation, determination of tensile characteristics after heat treatment at 180° C. for 1 hr., and evaluation of corrosion resistance after coating. The results are summarized in Table 12. The underlined figures in Table 11 are those which fail to achieve the requirements of the present invention.

TABLE 11

| Specimen | Composition (wt. %) | | | | | |
|---|---|---|---|---|---|---|
| No. | Si | Fe | Cu | Mn | Mg | Ti |
| 3 | 1.6 | 0.1 | 0.02 | 0.12 | 0.5 | 0.03 |
| 4 | 1.2 | 0.1 | 0.02 | 0.12 | 0.9 | 0.03 |
| 5 | 1.2 | 0.1 | 0.02 | 0.30 | 0.5 | 0.03 |
| 6 | 1.1 | 0.1 | 0.02 | 0.12 | 0.5 | 0.30 |
| 7 | 0.6 | 0.1 | 0.02 | 0.12 | 0.5 | 0.03 |
| 8 | 1.1 | 0.1 | 0.02 | 0.12 | 0.2 | 0.03 |
| 9 | 1.1 | 0.1 | 0.02 | 0.01 | 0.5 | 0.03 |
| 10 | 1.1 | 0.1 | 0.02 | 0.12 | 0.5 | <0.01 |
| 11 | 1.1 | 0.4 | 0.02 | 0.12 | 0.5 | 0.03 |
| 12 | 1.1 | 0.1 | 0.28 | 0.12 | 0.5 | 0.03 |

TABLE 12

| Specimen No. | Base material: Tensile characteristics σB MPa | Base material: Tensile characteristics σ 0.2 MPa | Base material: Tensile characteristics δ % | Base material: Er value mm | Product surface quality after tensile deformation | Tensile characteristics after tensile deformation followed by heat treatment at 180° C. for 1 hr. σB MPa | σ 0.2 MPa | δ % | Maximum length of filiform corrosion mm |
|---|---|---|---|---|---|---|---|---|---|
| 3 | 235 | 148 | 32 | 9.8 | Good | 315 | 256 | 19 | 1 |
| 4 | 242 | 152 | 31 | 9.7 | Good | 320 | 261 | 18 | 1 |
| 5 | 220 | 120 | 29 | 9.2 | Good | 307 | 246 | 17 | 0 |
| 6 | 216 | 119 | 28 | 9.1 | Good | 301 | 245 | 16 | 0 |
| 7 | 178 | 81 | 31 | 9.7 | Good | 267 | 152 | 18 | 0 |
| 8 | 168 | 76 | 30 | 9.9 | Good | 257 | 135 | 20 | 0 |
| 9 | 213 | 116 | 31 | 9.8 | Rough surface | 304 | 240 | 20 | 0 |
| 10 | 215 | 110 | 30 | 9.4 | Good | 303 | 234 | 18 | 0 |
| 11 | 221 | 124 | 29 | 9.0 | Good | 311 | 245 | 15 | 0 |
| 12 | 244 | 122 | 32 | 10.2 | Good | 325 | 255 | 17 | 5 |

As shown in Table 12, Specimen No. 3 contains a large amount of Si, so that the proof stress in the forming stage is high and the formability is poor. Since Specimen No. 4 contains a large amount of Mg, the formability is poor. Specimen Nos. 5 and 6 contain large amounts of Mn and Ti, respectively, so they are inferior in formability. Specimen Nos. 7 and 8 contain less Si and Mg, respectively, and show low proof stress after coat-baking and have inferior anti-denting properties. Specimen No. 9 contains less Mn and does not achieve sufficient reduction in crystal grain size, so it generates a rough surface during the forming stage. Specimen No. 10 contains less Ti, and Specimen No. 11 contains an excess amount of Fe, so they are inferior in formability. Specimen No. 12 exceeds the specified Cu content limit it has poor resistance to filiform corrosion.

Example 4

An ingot of aluminum alloy comprising 1.2 wt. % of Si, 0.4 wt. % of Mg, 0.05 wt. % of Mn, 0.02 wt. % of Ti, 0.1 wt. % of Fe, 0.02 wt. % of Cu, with the remainder comprising Al plus inevitable impurities was prepared using a semi-continuous casting process. The prepared ingot was surface-ground and then subjected to a homogenization treatment at 530° C. for 10 hrs., and was cooled to 420° C. The hot-rolling of the ingot was begun at 420° C. and ended at 260° C. The rolled plate was then subjected to intermediate annealing at 410° C. for 1 hr. or this step was omitted, followed by cold-rolling to 75% of draft, solid solution treatment at 540° C. for 20 sec., quenching, allowing to stand at room temperature for 1 week, and final heat treatment at 220° C. for 15 sec. to obtain plates with a thickness of 1 mm.

The obtained plates were used as the specimens. As in Example 1, tensile tests and Erichsen tests were applied to these specimens, and the product surface quality was observed by giving 2% tensile deformation to simulate press-forming work. In addition, the specimens were subjected to heat treatment at 180° C. for 1 hr., equivalent to coat-baking treatment, after the tensile deformation to determine the tensile characteristics. After the tensile deformation, the coating treatment was given as in Example 1 to evaluate the corrosion resistance under the same conditions as in Example 1. Results are summarized in Table 13. As seen in Table 13, Specimen No. 13 (with intermediate annealing) and Specimen No. 14 (without intermediate annealing), both of which were prepared according to the present invention, show high hardenability and have excellent proof stress exceeding 200 MPa, while demonstrating no filiform corrosion in the post-coating corrosion test, indicating excellent corrosion resistance.

TABLE 13

| | Base material: Tensile characteristics | | | Base material | Product | Tensile characteristics after tensile deformation followed by heat treatment at 180° C. for 1 hr. | | | Maximum |
|---|---|---|---|---|---|---|---|---|---|
| Specimen No. | σB MPa | σ 0.2 MPa | δ % | Er value mm | surface quality after tensile deformation | σB MPa | σ 0.2 MPa | δ % | length of filiform corrosion mm |
| 13 | 216 | 119 | 33 | 10.1 | Good | 307 | 244 | 19 | 0 |
| 14 | 218 | 122 | 30 | 9.9 | Good | 312 | 248 | 18 | 0 |

Comparative Example 5

An aluminum alloy ingot with the same composition as that in Example 2 was prepared using a semi-continuous casting process. The prepared ingot was surface-ground and treated using the process given in Table 14 to obtain plates with a thickness of 1 mm. These plates were subjected to chromate treatment similar to Example 2 to form a chromate film. The test results are listed in Table 15. The underlined figures in Table 14 are those which fail to achieve the requirements of the present invention.

TABLE 14

| Specimen | Homogenization | Temperature at beginning and end of the heat treatment ° C. | Intermediate annealing | Cold rolling % | Solid solution treatment | Final heat treatment |
|---|---|---|---|---|---|---|
| A | 450°C.-10h | 420/260 | 410° C.-1h | 75 | 540° C.-20s | 220° C.-15s |
| B | 530° C.-10h | 530/260 | 410° C.-1h | 75 | 540° C.-20s | 220° C.-15s |
| C | 530° C.-10h | 420/260 | 410° C.-1h | 50 | 540° C.-20s | 220° C.-15s |
| D | 530° C.-10h | 420/260 | 410° C.-1h | 75 | 480°C.-20s | 220° C.-15s |
| E | 530° C.-10h | 420/260 | 410° C.-1h | 75 | 540° C.-20s | 180°C.-15s |
| F | 530° C.-10h | 420/260 | 410° C.-1h | 75 | 540° C.-20s | 280°C.-15s |

TABLE 15

| | Base material: Tensile characteristics | | | Base material | Product | Tensile characteristics after tensile deformation followed by heat treatment at 180° C. for 1 hr. | | | Maximum |
|---|---|---|---|---|---|---|---|---|---|
| Specimen No. | σB MPa | σ 0.2 MPa | δ % | Er value mm | surface quality after tensile deformation | σB MPa | σ 0.2 MPa | δ % | length of filiform corrosion mm |
| A | 172 | 88 | 30 | 9.5 | Good | 285 | 192 | 17 | 1 |
| B | 224 | 120 | 32 | 10.0 | Poor | 311 | 252 | 19 | 0 |
| C | 221 | 121 | 30 | 9.4 | Rough surface | 307 | 246 | 17 | 0 |
| D | 175 | 76 | 27 | 8.9 | Good | 212 | 110 | 20 | 2 |
| E | 214 | 115 | 33 | 10.1 | Good | 264 | 157 | 18 | 0 |
| F | 245 | 157 | 27 | 8.8 | Good | 312 | 232 | 15 | 1 |

<<Note>> Specimen B generted surface ridging marks after tensile deformation.

As shown in Table 15, Specimen A was subjected to homogenization at an excessively low temperature level so that the formation of a $Mg_2Si$ solid solution became insufficient, resulting in weak coat-baking hardenability and failure to obtain a proof stress at or above 200 MPa. Specimen B was treated using an excessively high hot-rolling starting temperature, and the growth of the structure became excessive during the hot-rolling stage, which resulted in the generation of ridging marks after the forming work. Specimen C was treated by small draft cold-rolling before solid solution treatment, so the decomposition of the hot-rolled structure was not satisfactorily performed, and the resulting formability was poor. Since Specimen D was maintained at a low temperature level during the solid solution treatment, the formability became poor, and the formation of a solid solution of the deposit was insufficient, and it failed to achieve satisfactory strength after coat-baking. Specimen E underwent an excessively low temperature final heat treatment, and the obtained coat-baking hardenability was insufficient and failed to obtain a proof stress at or above 200 MPa. Specimen F was subjected to excessively high temperature of final heat treatment, and its formability was poor.

As described above, the present invention provides an aluminum alloy that has excellent formability, high coat-baking hardenability, and high proof stress of 200 MPa or above after the coat-baking stage. It also shows favorable product surface quality after forming and excellent corrosion resistance. The aluminum alloy sheet is particularly suitable for external automobile body plates.

What is claimed is:

1. A coated aluminum alloy sheet having excellent formability comprising an aluminum alloy comprising 0.9 to 1.3 wt. % Si, 0.4 to 0.6 wt. % Mg, 0.05 to 0.15 wt. % Mn, 0.01 to 0.1 wt. % Ti and the balance being Al and inevitable impurities, with the provisos that Fe is not present as an impurity in an amount greater than 0.2 wt. % and Cu is not present as an impurity in an amount greater than 0.1 wt. %, and a lubricant coating film provided on the aluminum alloy, the lubricant coating film comprising 60 to 90 wt. % of a water-dispersible polyurethane resin, 5 to 20 wt. % of particles of a silicon compound and 5 to 30 wt. % of a solid lubricant comprising a natural wax, a polyolefin wax and a fluororesin powder, said coated aluminum alloy sheet having a proof strength of at least 200 MPa after coat-baking treatment at 180° C. for 1 hour.

2. The coated aluminum alloy sheet of claim 1, wherein the particles of the silicon compound have an average particle size of from 0.05 to 40 $\mu$m.

* * * * *